UNITED STATES PATENT OFFICE.

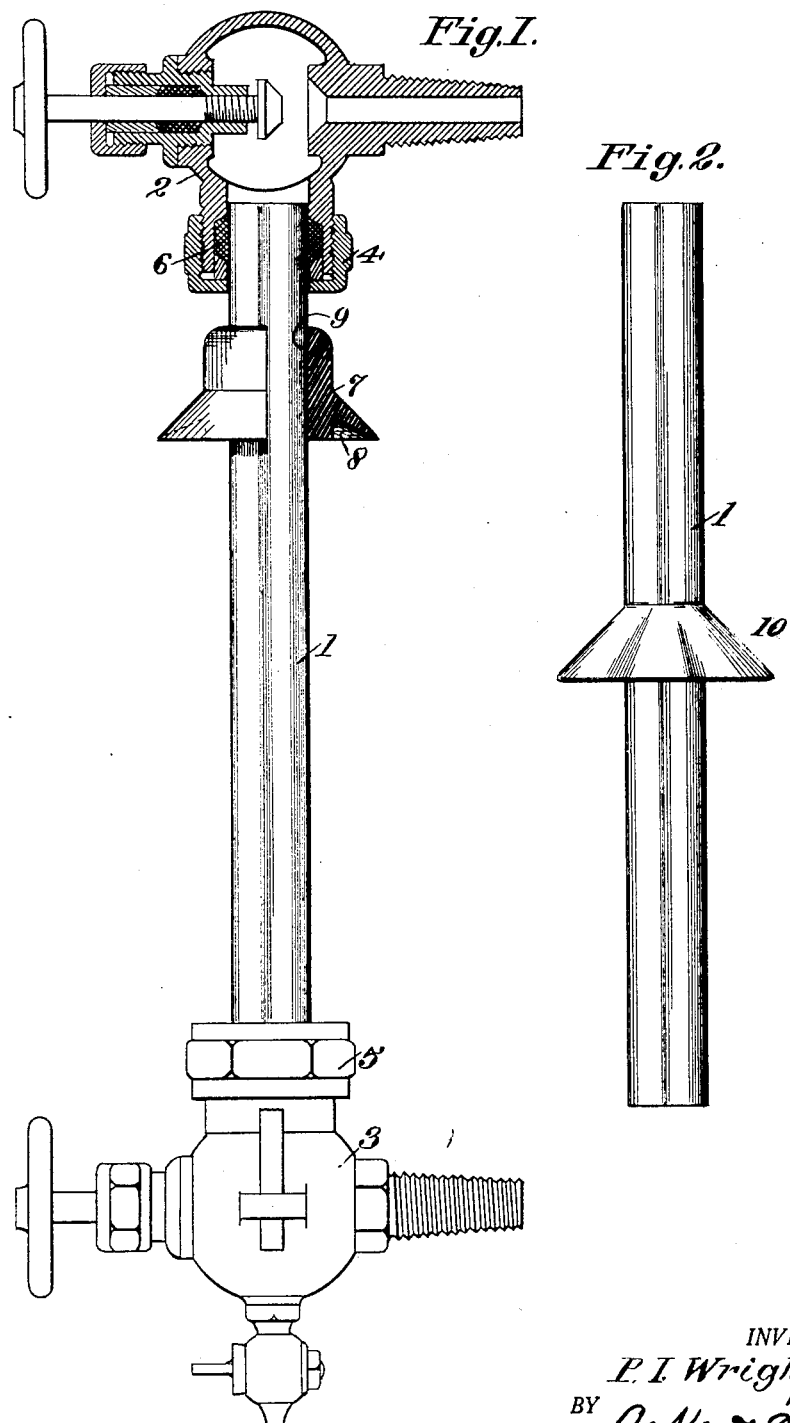

PHILIP IGNACIOUS WRIGHT, OF OAKLAND, CALIFORNIA.

STEAM-GAGE.

1,387,676.  Specification of Letters Patent.  Patented Aug. 16, 1921.

Application filed November 24, 1920. Serial No. 426,145.

*To all whom It may concern:*

Be it known that I, PHILIP I. WRIGHT, a citizen of the United States, residing at Oakland, in the county of Alameda and State of California, have invented certain new and useful improvements in Steam-Gages, of which the following is a specification.

The present invention relates to glass gages employed in connection with steam boilers generally, and the same resides in means in association to the glass tube of the gage to protect the exterior surface thereof from becoming fouled by the deposit of dirt thereon due to water trickling over its face and thereby obstructing the view as to the position of the water level within the tube, which coating deposited on the tube prevents the engineer or the one attending the boiler from being able to quickly and correctly determine at a glance the true water level within the gage.

As at present installed, the tube of the gage is unprotected, its upper end fitting within the securing nut for attaching the same to the cock communicating with the steam space of the boiler. Being so exposed there is caused within a short while after installation a leak between the securing nut and the outer wall of the tube of the glass gage, with the result that rusty water and foreign matter trails down the outer exposed surface of the glass tube, until eventually the view of the water level within the tube is obstructed to such a degree as to cause a miscalculation as to the true water level within the tube. The object of the invention is to maintain the surface of the tube of the glass gage free from the deposit thereon of the leaky dirty water and the foreign matter carried thereby, and by so doing maintaining at all times a clear and unobstructive view of the water level within the gage tube, thus overcoming the annoyance to which the one in charge of the gage experiences by reason of the difficulty in obtaining an unobstructive view for a correct reading of the water level.

In its preferred embodiment the protecting means comprises a cylindrical protector removably applied to the glass tube so as to be positioned adjacent the under exposed face of the upper securing nut, but if so desired the protector may be formed integral with the glass tube.

To comprehend the invention, reference should be had to the accompanying sheet of drawings, wherein—

Figure 1 is a part sectional view in side elevation of a glass gage with the protector applied thereto and the tube secured within the gage cocks.

Fig. 2 is a similar view of the glass tube with the protector formed integral therewith.

In the drawings, the numeral 1 is used to indicate the glass tube of the gage and 2 and 3 respectively the upper and lower gage cocks to which the tube is secured by means of the securing nuts 4 and 5; the nut 4 holding the upper end of the tube 1 to the gage cock 2 exposed to steam from the boiler to which the gage is applied, the connection between the end portions of the tube and the gage cocks being made as securely as possible by means of packing glands 6, only one being illustrated.

On the tube 1 (Fig. 1 of the drawings) is fitted a protector which comprises a cylindrical tapering collar portion 7, shaped substantially as shown, the under face of which is cut away as at 8 to provide against water trickling over its outer surface creeping inwardly toward the surface of the gage tube. This protector is formed, preferably, of a rubber compound capable of withstanding a high degree of heat, and the same is formed with a vertical bore 9 to enable the same to be fitted onto the tube 1. Inasmuch as the glass tubes are made in varying sizes, the bore 9 will likewise vary, but the same should be of a diameter approximately ⅛ of an inch less than the external diameter of the glass tube to which it is to be applied in order to insure a tight fit thereon, and provide a water seal. The protector being adjustable, its position may be varied relative to the tube and so positioned that its lower edge indicates the normal water level for the gage. This, however, is left to the option of the person having charge of the boiler, where the protector is adjustable relative to the tube. With the protector positioned and the tube secured to the gage cocks, it is apparent that such water leakage as takes place between the securing nut 4 and the upper end portion of the tube 1, will flow downwardly over the outer surface of the protector and drop from the lower edge thereof, which owing to the diameter of the protector at such point is removed a distance from the outer surface of the tube.

The dirty, rusty leakage water is thus shed clear of the gage tube and its face maintained clear thereof, with the result that an unobstructive vision of the position of the water within the tube is obtained at all times. This is a feature which will be greatly appreciated by those required to keep watch of gage readings of a boiler.

While preference is given to providing a protector capable of adjustment relative to the gage tube, nevertheless the protector may be formed integral with the glass tube 1, and in Fig. 2 of the drawings the tube 1 is indicated as having formed integral therewith the water shedding protector 10. Other than being integral with the tube 1, the protector 10 is substantially the same as the protector 7, and serves the purpose thereof as an umbrella for shedding the drip or leak water and maintaining the same free of the surface of the tube 1 below the under surface of the protector. Where made integral with the tube 1, preference is given that the protector be so positioned from the upper end of the tube that its lower edge shall stand at a point indicative of the normal water level reading for the tube.

It will be understood that where the protector is manufactured for application to the tubes of glass gages, that the same may be constructed of any material suitable for the purpose desired and whether the protector is movable relative to the tube or formed integral therewith, any desired shape may be given thereto, just so long as the water being shed is not permitted to back creep from the lower edge thereof onto the surface of the tube to be protected.

Having thus described the invention, what I claim as new and desire to protect by Letters Patent is:—

1. The combination with the glass tube of a steam gage fixture, having securing nuts for the upper and lower ends thereof, of a water shedding protector secured on the tube to lie intermediate the securing nut for its upper end and the normal water level designation of the tube.

2. The combination with the glass tube of a steam gage fixture, having securing nuts for the upper and lower ends thereof, of a water shedding protector secured on the tube to lie intermediate the securing nut for its upper end and the normal water level designation of the tube, said protector having its under surface cut away adjacent the periphery thereof to provide against the back creeping of water flowing over the protector.

3. The combination with the glass tube of a steam gage fixture, having securing means for the upper and lower ends of a water shedding protector adjustably mounted on the tube and adapted to be positioned intermediate the securing means for its upper end and the normal water level designation of the tube.

4. A glass tube for steam gage fixtures provided with means for shedding water, said means including a protector located intermediate the upper end of the tube and the position indicative of its normal water level.

5. A steam gage fitting, the same comprising an upper and lower connecting cock, a glass tube, means for securing the ends of the tube within said cocks, and a protector for shedding water associated with the tube and applied thereto intermediate the securing means for the upper end of the tube and the position thereof indicative of the normal water level of the tube.

6. The combination with the glass tube of a steam gage fitting, of a water shedding protector applied thereto, the same comprising a cylindrical downwardly inclined structure, the terminal portion of which is of a diameter to cause water trickling thereover to discharge clear of the surface of the tube.

7. The combination with the glass tube of a steam gage fixture, of a water shedding protector thereon situated intermediate its upper end and the normal water level position for the tube, the same comprising a conical structure having its lower end cut away on its under surface adjacent its periphery to prevent the back creeping of water flowing from said protector.

In testimony whereof I have signed my name to this specification.

PHILIP IGNACIOUS WRIGHT.